(12) United States Patent
Kim (10) Patent No.: US 6,581,829 B2
(45) Date of Patent: Jun. 24, 2003

(54) METHOD FOR DISCRIMINATING PRODUCTION BACKGROUND OF PRODUCT BY BAR CODE SYSTEM

(76) Inventor: Jeom Doo Kim, Mokdong Apt. 926-606 312, Shinjeong 1-dong, Yangchon-ku, Seoul (KR), 158-071

( * ) Notice: Subject to any disclaimer, the term of this patent is extended or adjusted under 35 U.S.C. 154(b) by 202 days.

(21) Appl. No.: 09/877,273

(22) Filed: Jun. 8, 2001

(65) Prior Publication Data

US 2002/0084328 A1 Jul. 4, 2002

(30) Foreign Application Priority Data

Jun. 7, 2000 (KR) .................................... 2000-0031044

(51) Int. Cl.⁷ .......................... G06F 17/00; G06F 17/60
(52) U.S. Cl. ...................................... 235/385; 235/375
(58) Field of Search ............... 235/375, 462.01–462.25, 235/472.01–472.03, 380, 382, 383, 385, 382.5

(56) References Cited

U.S. PATENT DOCUMENTS

| | | | |
|---|---|---|---|
| 5,038,283 A | * 8/1991 | Caveney | 705/28 |
| 5,063,507 A | * 11/1991 | Lindsey et al. | 705/26 |
| 5,285,383 A | * 2/1994 | Lindsey et al. | 705/26 |
| 5,478,990 A | * 12/1995 | Montanari et al. | 235/375 |
| 5,541,394 A | * 7/1996 | Kouchi et al. | 235/375 |
| 5,700,998 A | * 12/1997 | Palti | 235/375 |
| 6,053,597 A | * 4/2000 | Hirota | 347/19 |
| 2002/0084328 A1 | * 7/2002 | Kim | 235/462.01 |

\* cited by examiner

Primary Examiner—Thien M. Le
(74) Attorney, Agent, or Firm—King & Schickli, PLLC

(57) ABSTRACT

A method for discriminating the production background of products by a bar code system (related to Korean Patent Application No. 2000-12346) is disclosed, in which the production background of a desired product can be known quickly and easily by an ES code (environmental protection and safety code) marked on the products for the sake of the convenience of the consumers. The ES code system of the present invention is for consumers, whereas the conventional bar codes are for only producers and distributors. The ES code and a producer ID bar code are marked side by side on each product. A consumer can read these bar codes by means of a reading means, and can be connected to an ES code service exclusive internet server to transmit the read signals. The server can analyze the requested data (production background) on various items such as soil, water quality, air pollution degree, analysis information, factory noise, foul odor, generation of dusts, exhaustion gas, release of waste water, management of waste materials, ecological evaluation, and other analysis data. Then the server transmits the analyzed data to the consumer, so that the consumer can understand the production background of the product. Thus the procurements of environmentphilic products are encouraged, while the procurements of anti-environmental products are discouraged. Accordingly, the environment can be protected from contamination and pollution, while the product safety is promoted.

21 Claims, 9 Drawing Sheets

Internet domain address bar code

Producer ID bar code

ES code

Serial number of Goods shipped

FIG 1

| Internet domain address bar code | Producer ID bar code | ES code | Serial number of Goods shipped |

METHOD FOR DISCRIMINATING PRODUCTION BACKGROUND OF PRODUCT BY BAR CODE SYSTEM

FIELD OF THE INVENTION

The present invention relates to a method for discriminating the production background of products by a bar code system. More specifically, the present invention relates to a method for discriminating the production background of products by a bar code system (related to Korean Patent Application No. 2000-12346), in which the production background of the products to be procured can be known quickly and easily by an ES code (environmental protection and safety code) marked on the products for the sake of the convenience of consumers.

BACKGROUND OF THE INVENTION

Generally, the bar codes are marked on every product, and these bar codes are for the convenience of the product makers and distributors, the bar codes containing commodity name, commodity serial number, price and the like. Thus the bar codes have no relation to consumers, and therefore, consumers buy the commodities based only on the general information which are specified by the producers or the distributors.

A product recommending system which utilizes the bar codes of the products has been disclosed in PCT WO 97/46960(dated Dec. 11, 1997). In this system, the sets of information such as ingredients of the products, their characteristics, their origins and the like are inputted and stored in the central data base. Meanwhile, the members of the product information server of the super market inputs the data such as health state, the obesity, the pathological history, the current illness, the taste and the like. If a customer selects a commodity, and if its bar code is transmitted to the central information server, then the desirability of the commodity in view of the inputted health status of the customer is notified to the customer. This is a kind of health service by the super market to the customers.

This product recommending system properly recommends the commodities to the customers in accordance with the health status of the customers, thereby providing an assistance to keeping the customers' health.

Thus so far, the product evaluation has been focused on the price and quality, but the production background has been utterly excluded from the evaluation.

However, one of the serious problems which are imminently coming to the mankind is the environmental pollution and contamination, and this is closely related to the industrial progress.

The commodities which are exhibited at department stores and super markets are put to the competitive relations. Under this condition, the products which have not been maleficent to the environment during the productions must be different in their profits from the products which have been maleficent to the environment during the productions.

Accordingly, in the purely economical view, the producers who have not invested in the environmental protection projects are much advantageous compared with the producers who have very much invested in the environmental protection projects.

If consumers buy the commodities without considering the above described circumstance, then the producers who have not invested in the environmental protection projects will occupy always the superior position over the producers who have very much invested in the environmental protection projects, because the former are always ensured of higher profits. If this situation continues, the environmental problem will be more and more aggravated. The resultant adverse effects are entirely inflicted on the whole mankind, and therefore, this environmental problem has to be redressed at the present time.

In an effort to solve this problem, the present inventor filed Korean Patent Application No. 2000-12346. In this technique, there is disclosed an environmental contamination preventing system based on direct transactions of agricultural products, livestock products, marine products, and forestry products. In this system, there are stored various kinds of data such as agricultural chemicals, fertilizers, vinyl sheets, drugs, fodder, soil, water quality, air, time of use of other chemicals, their use amounts, their ingredients, their influence to the environment and the like. Thus the consumers can download the information of the production background for a certain commodity through a PC and the internet. In this system, however, the consumers cannot obtain the information on the production backgrounds of commodities instantly at a department store or a super market, but the information can be obtained by going to a place where a PC is installed.

SUMMARY OF THE INVENTION

The present invention is intended to overcome the above described disadvantages of the conventional techniques.

Therefore it is an object of the present invention to provide a method for discriminating the production background of a product by a bar code system, in which an environmental protection and safety code (ES code) is marked for consumers together with a bar code for the producer or distributor, so that the consumer can connect to an ES code information server through a mobile phone or a PC, and the consumer can instantly discriminate the production background of the selected commodity.

It is another object of the present invention to provide a method for discriminating the production background of a product by a bar code system, in which the consumer can discriminate the production background of the product to confirm as to its environmentphilic feature, so that if the product is an environment-contaminating one, the product can be repudiated, and if the product is an environmentphilic one, then the procurement can be encouraged, thereby making it possible to prevent the environmental contamination and to promote the product safety.

It is still another object of the present invention to provide a method for discriminating the production background of a product by a bar code system, in which the conditions for the product procurement is shifted from the quality and the price to the production background, so that the producers of the environmentphilic products can improve their profits.

In the present invention, the ES information server collects various kinds of information from various information sources to store in its data base the production background such as soil, water quality, air pollution degree, analysis information, factory noise, foul odor, generation of dusts, exhaustion gas, release of waste water, management of waste materials, ecological evaluation, and other analysis data.

Figure 1:
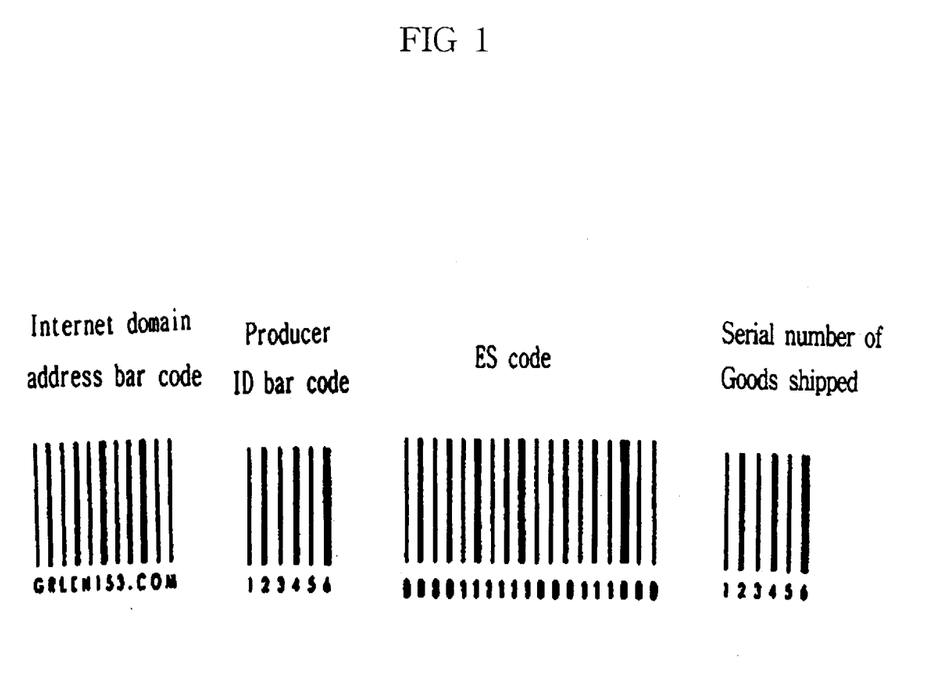
FIG. 1 is an exemplary illustration showing that the ES code, the internet domain address bar code and an ID bar code are put side by side according to the present invention.

Further, there are formed an ES code for the items such as product origin, district, commodity classification, gene modification, result of safety check, management of environmental contamination, production environment, production background of raw materials, production time, check digit, product shipping serial number and the like. Further, there is formed an internet domain address bar code for the internet domains which holds the above ES code information. Thus the ES code, the internet domain address bar code and an ID bar code are put side by side on each product as shown in FIG. 1.

BRIEF DESCRIPTION OF THE DRAWINGS

The above objects and other advantages of the present invention will become more apparent by describing in detail the preferred embodiments of the present invention with reference to the attached drawings, in which.

DETAILED DESCRIPTION OF THE PREFERRED EMBODIMENTS

When a consumer wants to procure a commodity at a department store or at a super market, the consumer reads the bar codes by using a reader of a composite mobile communication terminal, a reader of a laptop PC, or a web camera of a desk top computer.

The bar code at the left is an internet domain address bar code. Even if the consumer does not manipulate the keyboard of a computer, the consumer can be connected to an ES code information service exclusive server by the signals of the domain address bar code.

The bar code at the center is an ID bar code for the relevant product, and the signals of this bar code can designate a particular product from among the numerous products.

The ES code at the right is a bar code which requests for the information on the product. That is, the signals of this bar code make it possible for the consumer to extract the production background of the particular product from the data base of the server. Then an analyzed result of this information data is transmitted from the server to the consumer. Under this condition, the message which is received through the terminal to the consumer is a letter or vocal message. This message elaborates not the quality of the product but the production background. Examples are "Very good, and so, procurement is recommended.", "Just adequate, and so, procurement may be all right.". or "No good, and therefore, a recommendation cannot be forwarded." and the like. Other kinds of messages are possible, and the examples are "YES", "MAY BE", and "NO".

Accordingly, products having the same quality may show different messages depending on the evaluation of the production background. Of course, if the production background is environmentphilic, a recommendation will be forwarded.

If the consumer wants a specific information, then the consumer can be connected to the ES code service exclusive server through a PC, so that a specific information can be obtained.

Further, in the case where a producer specifies a false ES code for his or her own product, if a consumer connects to the server to request for the analyzed result of the production background for the product, then an authentic evaluation result is instantly transmitted to the consumer. Therefore, any producer cannot cheat consumers by fraudulent ES codes.

In this manner, the selection criteria of a commodity is shifted from the economic motive of to the production background. Consequently, the environmental contamination and pollution can be prevented, and the product safety can be promoted. Further, the producers who contribute to the preservation of the environment will be ensured of a proper profit, while the maleficent producers will fade away.

Now the embodiments of the present invention will be described below.

The ES code system according to the present invention includes the following items.

1, Origin (country of manufacture): 000 (e. g., Korea is 088).

2. District: 00 (e. g., Gyunggi province is 01).

3. Commodity classification: 1 (agricultural products), 2 (livestock products), 3 (forestry products), 4 (marine products), and 5 (processed products).

4. Gene modification: 1 (yes), 2 (no), 3 (1%-mixed), 4 (2%-mixed), 5(3%-mixed), and 6(more than 3%).

5. Safety checking: 1(passed), 2(failed), and 3(not confirmed).

6. Management of environmental contamination and pollution: 1(special), 2(upper), 3(medium), 4(ordinary), 5(no good), and 6(not confirmed). This is an evaluation for the items such as soil, water quality, air, noise, vibration, foul odor, dusts, exhaustion gas, release of waste water, ecological influence, management of waste materials and the like [the ISO (International Standardization Organization) 14000].

7. Production environment (food): this is for protecting the consumers from the harmful elements which may have been formed during the growth of the raw materials, their reaping, their distribution, and their storing. Hazard analysis critical control point (HACCP) is resorted, and it is classified into naturally produced, produced in bare soil, produced by facility, and produced under special environment.

8. Production method: 1(organic fertilizer used), 2(agricultural chemical not used), 3(agricultural chemicals used), 4(chemical fertilizer used), 5(chemicals used), and 6(not confirmed).

9. Production time: 000(the year 2000), 001(the year 2001), 1(January), . . . , 9(September), O(October), N (November), D (December).

10. Serial number of goods shipped: 100 (for checking forged or falsified goods, making it easy to trace the source of forgery or falsification).

In the above described production background code system, the item 6 is carried out in the following manner. That is, there are numerically shown the items of the production background such as soil, water quality, air pollution, noise of the production site, vibrations, dusts, exhaustion gas, release of waste water and the like in such a manner that the consumers can easily understand.

For example, at the ISO14000 standard, if the contamination management is best, it is 1 (special). If adequate, it is 2 (upper). If ordinary, it is 3 (medium). If no good, it is 4 (no good). If not confirmed, it is 5 (not confirmed).

In the case of the item 7, the harmful elements which may have been formed during the growth of the raw materials, their reaping, their production, their distribution and their storing should be prevented from reaching the consumers. That is, how much the prevention degree has been achieved is numerically expressed based on the HACCP.

For example, if the agricultural product is naturally produced, the numeral is 1. if it is grown in a bare soil, it is 2. If it is grown in a facility, it is 3. If it is grown in a semi-facility, it is 4. If not confirmed, it is 5. If the manufacturing process, distribution and storage are excellent, it is 6. If adequate, it is 7. If it is ordinary, it is 8. If no good, it is 9. If not confirmed, it is 0.

Regarding the use of chemicals, if organic fertilizer is used, it is 1. If no agricultural chemical is used, it is 2. If agricultural chemicals are used, it is 3. If bio-chemical is used, it is 4. If bio-fertilizer is used, it is 6. If hormone products are used, it is 7.

Regarding the item 5, the numerals are expressed in an easily understandable form based on the items 6, 7 and 8. For example, if the edibility is proper, it is 1. If it not proper, it is 2. If not confirmed, it is 3.

EXAMPLE 1

Figure 2:
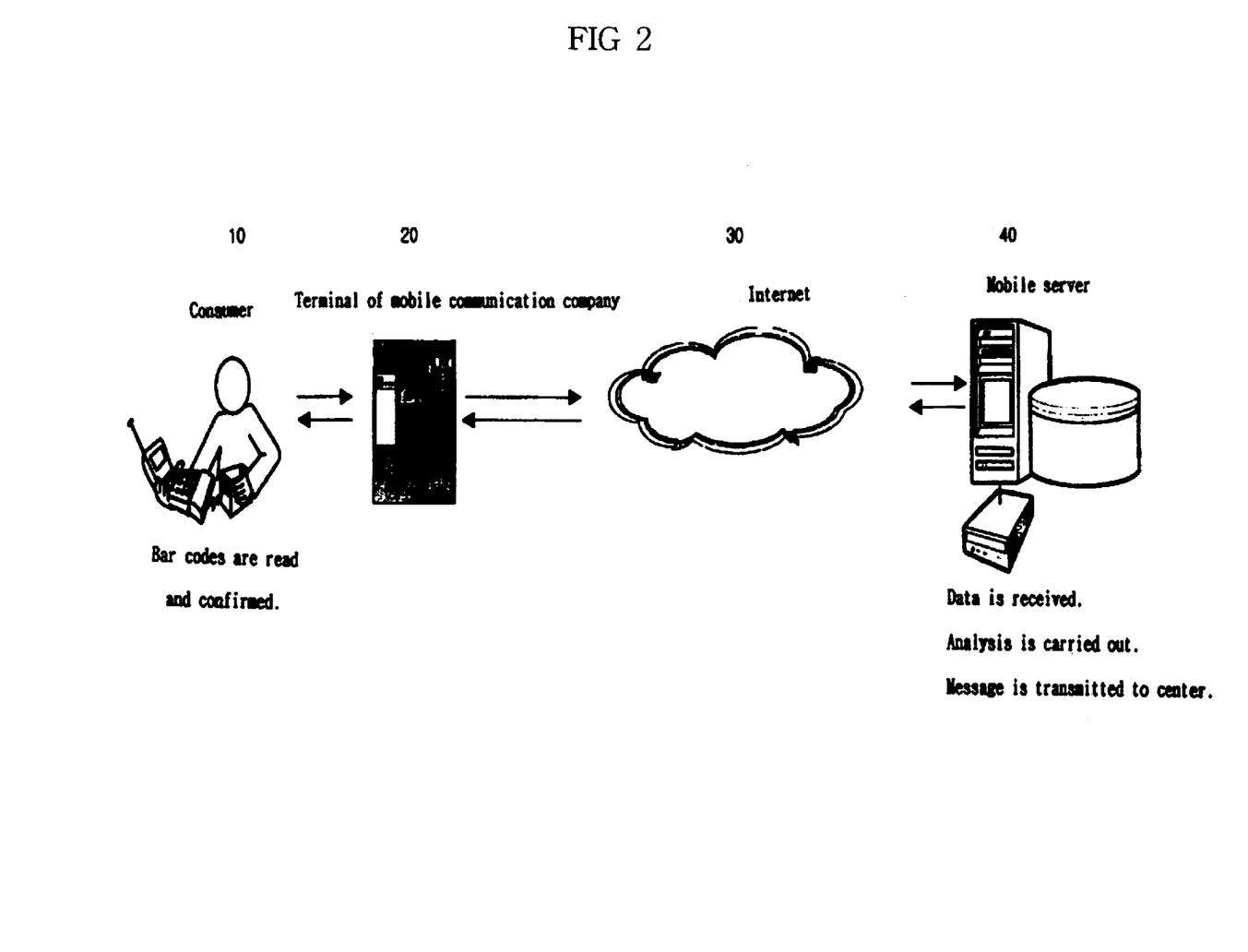
FIG. 2 is an exemplary illustration showing the ES code in a first embodiment of the present invention.

FIG. 2 is an exemplary illustration of the ES code system according to the present invention.

The mobile server stores the ES codes, i. e., various items such as soil, water quality, air, noise, vibrations, foul odor, dusts, exhaustion gas, release of waste water, influence to ecology, management of waste materials, growth of raw materials, their reaping, their distribution, their storage and the like. That is, in order that any harmful element formed by the above items can be prevented from being inflicted to the consumers, the ES codes on them are kept and operated. For this purpose, the server stores various kinds of information on the natural production, bare soil productions, facility production, special environmental production and the like based on the HACCP standard.

Meanwhile, the bar codes as shown in FIG. 1 are marked on the products of the producers who have subscribed to the ES code information server. The bar code at the left is the domain address bar code of the ES code information server, the bar code at the middle is the ID bar code of the producer, and the bar code at the right is the ES code.

If a consumer 10 wants to know the production background for a particular commodity, the bar code of FIG. 1 is read by means of a code reader of a mobile communication terminal. The bar code thus read is transmitted to a terminal 20 of the mobile communication company. Then from the terminal 20, a connection is made through an internet network 30 to an ES code service exclusive mobile server 40. This connection is carried out automatically by the domain address bar code of the left side.

TABLE 1

Table 1 below shows the constitution of the ES code.

| Origin (Country) | District | Kind of commodity | Classification | Gene modification | Safety inspection | Env contamination management | Production back ground | Production means | Check digit | Serial No. |
|---|---|---|---|---|---|---|---|---|---|---|
| 088 Korea | 01 Gyunggi province | 1 agricultural product | 1 no | 1 passed | 1 special | 1 natural | 1 organic fertilizer | 0011 Jan 2001 | 1 False data detection | 100 |

Auxiliary serial number 5

The ES code of Table 1 above is as shown in FIG. 1. The auxiliary serial numbers are used when the rows and columns of the code are too long.

In Table 1 above, the interpretation of the ES code is as follows.

Origin (country): 000 . . . 3-digit value

District: 00 . . . 2-digit value

Commodity classification: 1 . . . 1 digit value

Gene modification: 1 . . . 1 digit value

Safety check: 1 . . . 1 digit value.

Production background: 1 . . . 1 digit value

Environmental contamination management (based on the ISO14000 and ISO12001): 1 . . . 1 digit value (There are evaluated the items such as soil, water quality, air, analysis information, noise, vibrations, foul odor, dusts, exhaustion gas, release of waste water, management of waste materials, influence to ecology and the like.)

Method of raw material production: 1 . . . 1 digit value, to be interpreted as organic-fertilizing agriculture Production time: 4 . . . 4 digit value.

Serial number of goods shipped: 000000 . . . 6 digit value

The mobile server 40 identifies the product based on the ID bar code of the product, and analyzes the above described 9 items based on the ES code. The analysis and evaluation results are transmitted from the mobile server through the internet network 30 and the mobile communication company 20 to the consumer 20. That is, for the designated product, a message is transmitted such as "Good, and procurement is recommended.", "Just adequate, and procurement may be all right.", or "No good, and a recommendation cannot be forwarded.". If the consumer desires, a specific information on the production background can be obtained.

Figure 3:
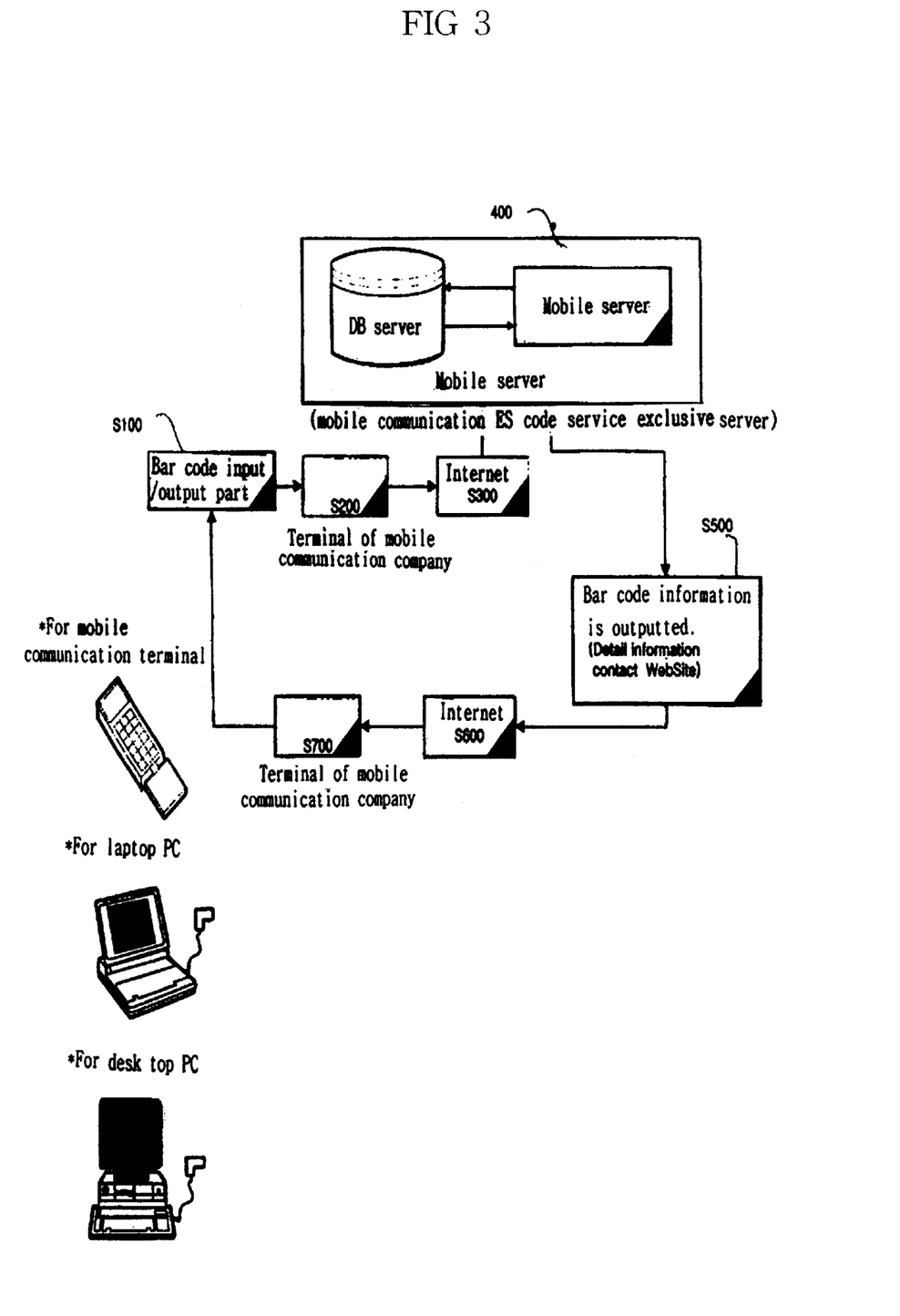
FIG. 3 is a block diagram showing the constitution of the ES code of the first embodiment of the present invention.

The ES code system which is used in Example 1 has a constitution as shown in FIG. 3. That is, the consumer selects one from among a code reader of a mobile communication terminal, a code reader of a laptop PC and a web camera of a desk top computer. The bar code signals thus read are transmitted from a bar code input/output part S100 through a mobile communication terminal S200 and an internet network S300 to an ES code exclusive service mobile server S400. Then the mobile server S400 extracts the production background for the particular product. The data thus extracted is outputted from a bar code information input/output part S500 through an internet network S600 and a mobile communication company S700 to the bar code input/output part S100 of the consumer so as for the consumer to identify the information on the product.

Figure 4A:
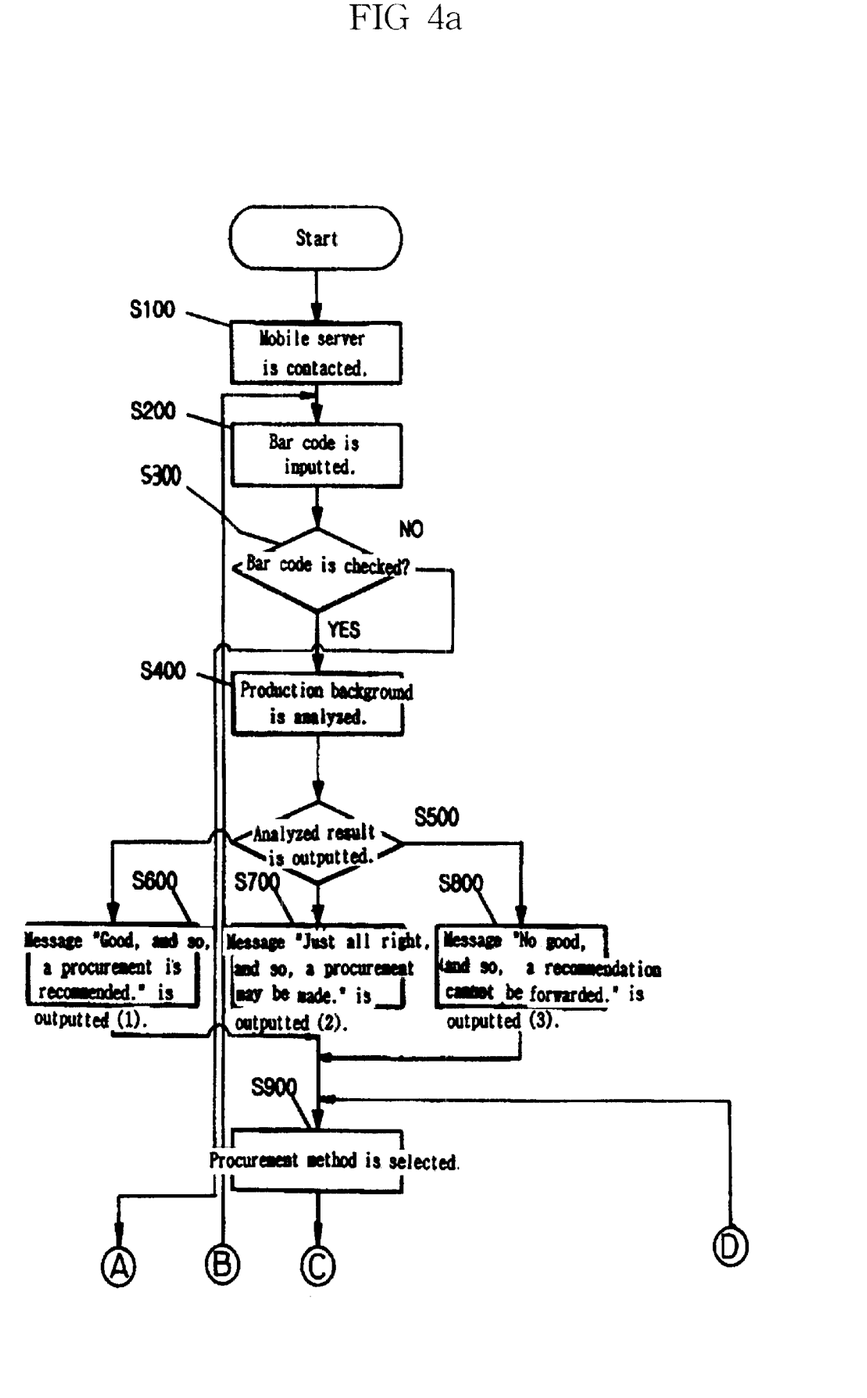
FIGS. 4a and 4b are flow charts showing the operation procedure of the ES code system according to the present invention.
Figure 4B:
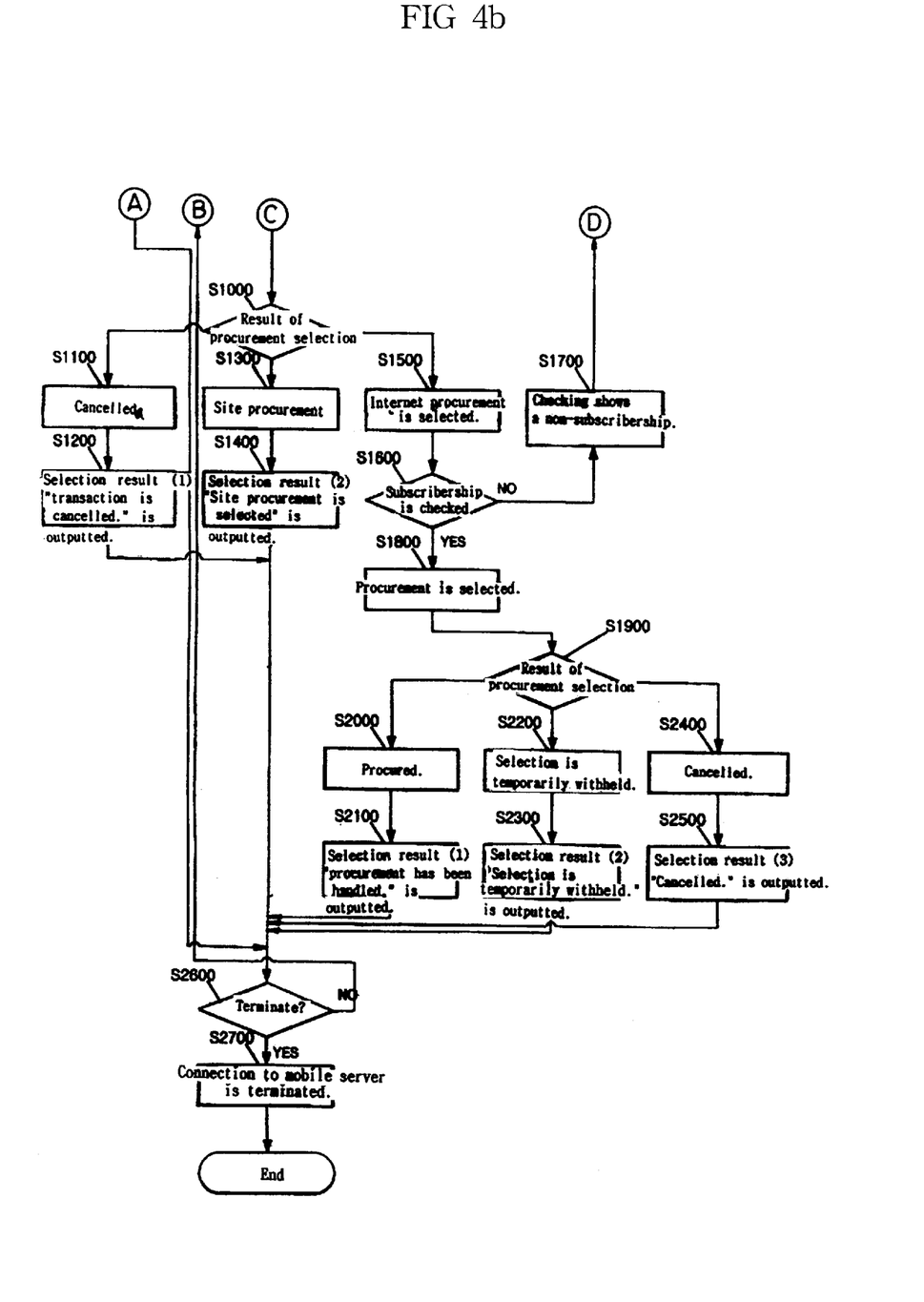

Under this condition, the flow chart for the operation of the ES code system is as shown in FIG. 4. The reference codes of FIG. 4 are different from those of FIG. 3. For example, S100 of FIG. 3 indicates something different from S100 of FIG. 4.

At a step S100, the bar code signals of the product are connected to the ES code information exclusive server, and at a step S200, the bar code signals are inputted. Upon carrying out a search, if there is no relevant data, then the system returns to the initial status. At a step S300, if it is found that the relevant product has been registered in the data base DB, then at a step S400, the production background is analyzed. Then at a step S500, the analysis results are ordered to be outputted. Then at a step S600, an analysis result is outputted in a form of "Good, and so, procurement is recommended." At a step S700, an analysis result is outputted in a form of "Just all right, and so a procurement may be made." At a step S800, an analysis result is outputted in a form of "No good, and so, a recommendation cannot be forwarded.". At a step S900, the procurement method is selected, and at a step S1000, the selection of the procurement method is designated. If the transaction is cancelled at a step S1100, then the result of the cancellation of the transaction is outputted at a step S1200. At a step S1300, if it is a site procurement by a consumer, then at a step S1400, the result of the selection of the consumer site procurement is outputted. As a result of the procurement selection at the step S1000, if an internet procurement selection is done at a step S1500, then a subscriber certification search is carried out at a step S1600. If the consumer is not a subscriber, then a non-subscribership result is outputted at a step S1700, with the result that the information is denied. On the other hand, if the consumer is a subscriber, then whether the commodity is to be procured or not is decided at a step S1800. As a result of the selection of the procurement at a step S1900, if the procurement is decided at a step S2000, the result of the decision is outputted at a step S2100. If the procurement is temporarily withheld at a step S2200, then the selection of the withholding is outputted at a step S2300. If the procurement is cancelled at a step S2400, then the result of the cancellation is outputted at a step S2500. Then at a step S2600, whether the transaction is terminated is outputted. If it is terminated, then at a step S2700, the connection is terminated. On the other hand, if it is not terminated, then the system returns to the initial step S200.

Besides the above messages, if desired, the consumer can obtained specific kinds of information including: primary production background data such as soil analysis information, water quality information, air analysis information and the like; and secondary production background data such as agricultural chemicals, fertilizers, chemicals, fodder and the like. Further, other production background data such as the contaminating element analysis for noise, vibrations, foul odor, dusts, exhaustion gas, release of waste water, management of waste materials and the like can also be obtained.

EXAMPLE 2

Figure 5:
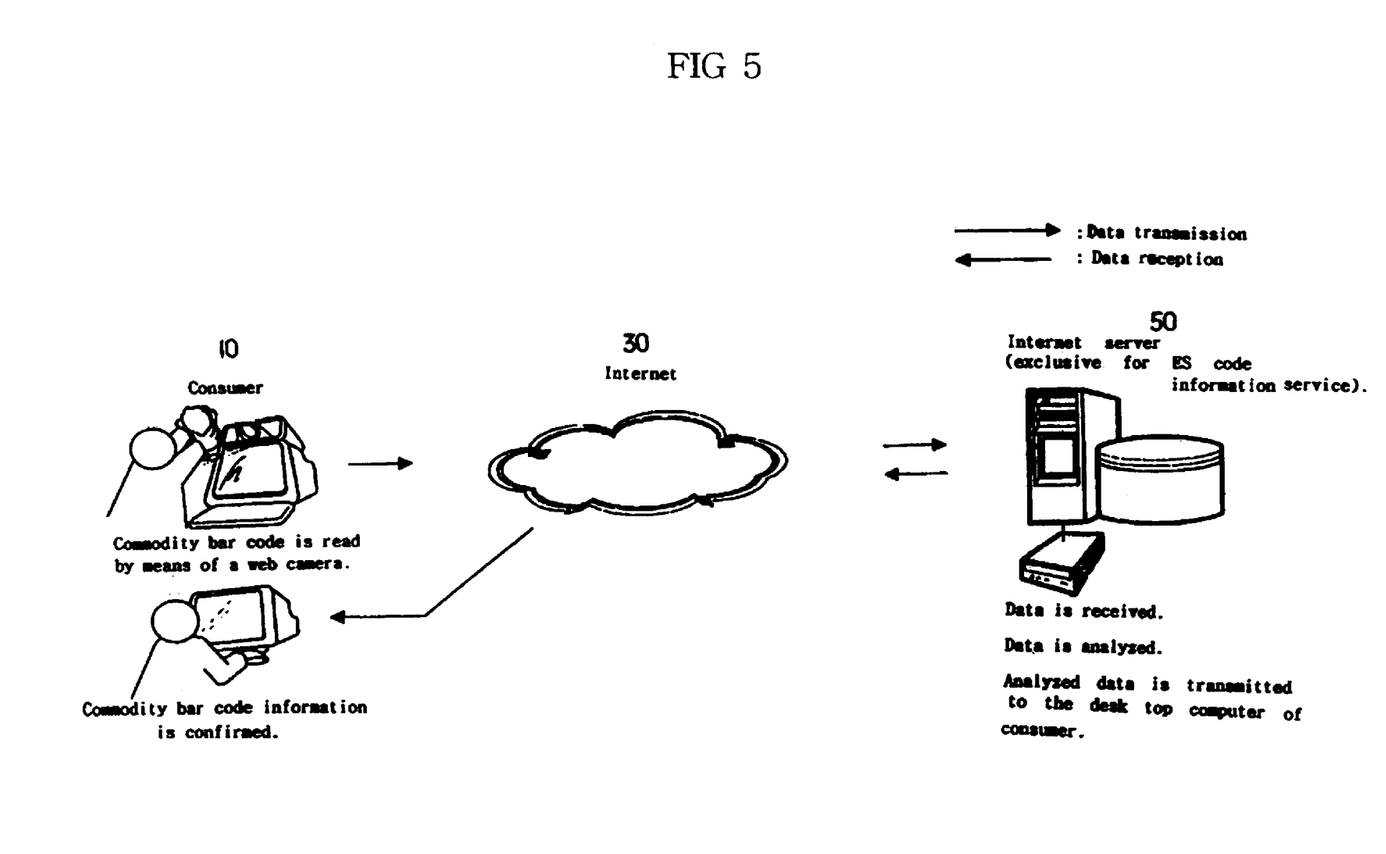
FIG. 5 illustrates the ES code in a second embodiment of the present invention.

FIG. 5 illustrates the ES code in a second embodiment of the present invention.

If a consumer 10 wants to know the production background of a desired product, then the consumer reads the above described three kinds of the bar codes by using a web camera of a desk top computer which is installed at the department store or the super market. The bar code signals thus read are transmitted directly through the internet network 30 to an ES code information service exclusive internet server 50. After receipt of the data, the internet server 50 searches and analyzes the requested data, and then, transmits the analyzed data through the internet network 30 to the desk top computer of the department store, so that the consumer 10 understands the production background of the designated product.

Figure 6:
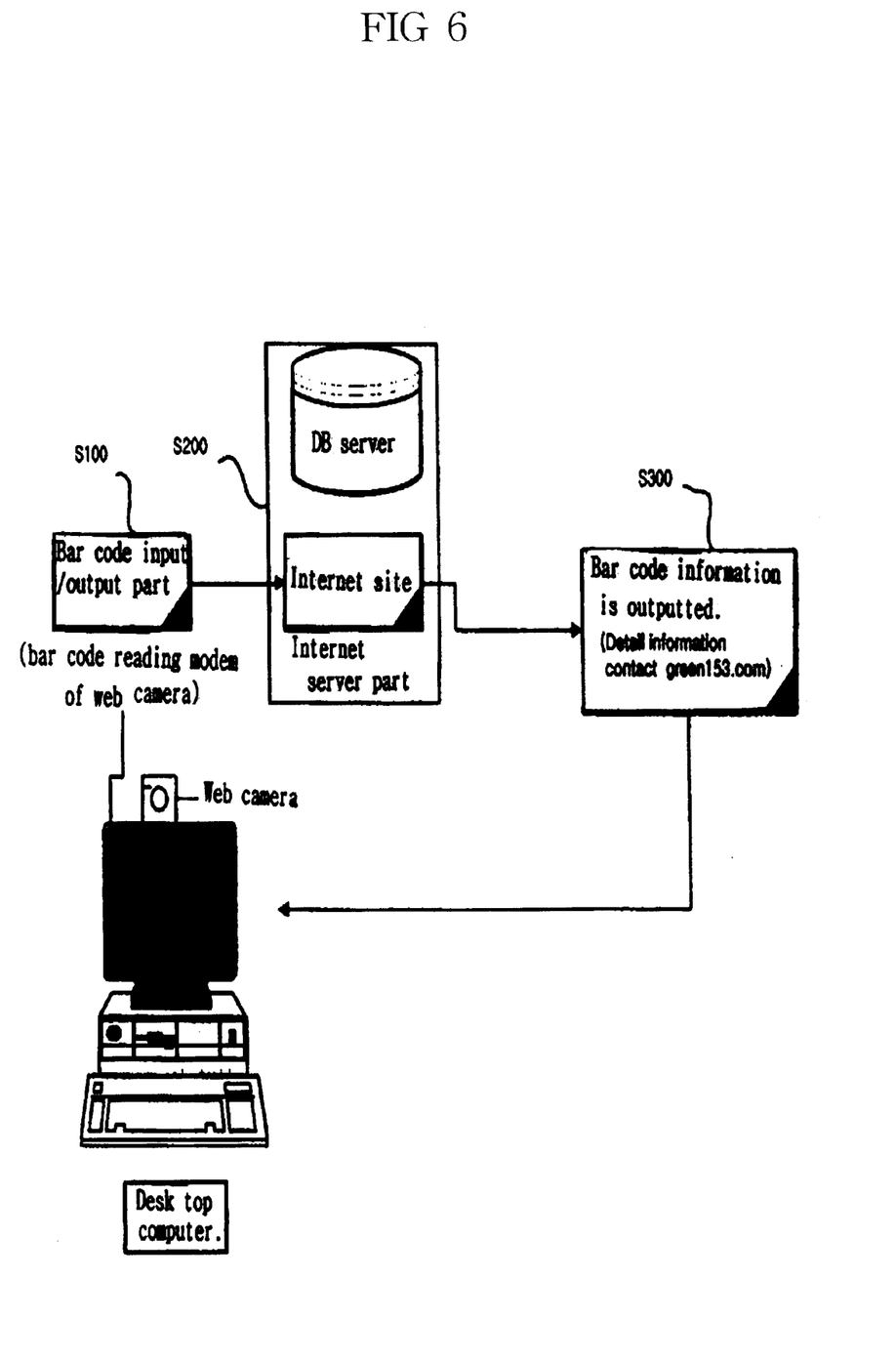
FIG. 6 illustrates the constitution of the system which is applied to the second embodiment of the ES code system according to the present invention.

Under this condition, the constitution of the system for Example 2 is as shown in FIG. 6.

As shown in this drawing, the bar code signals which have been read are transmitted from a bar code input/output part S100 (a bar code reading modem) to an internet site S200. An internet server searches into its data base to find the production background of the particular product, and analyzes the production background of the product. The production background thus analyzed is outputted through a bar code information outputting part S300. The data thus outputted is displayed on the screen of the desk top computer of the consumer. Under this condition, the furnished message or information is same as the case of the first use of the ES code.

Figure 7A:
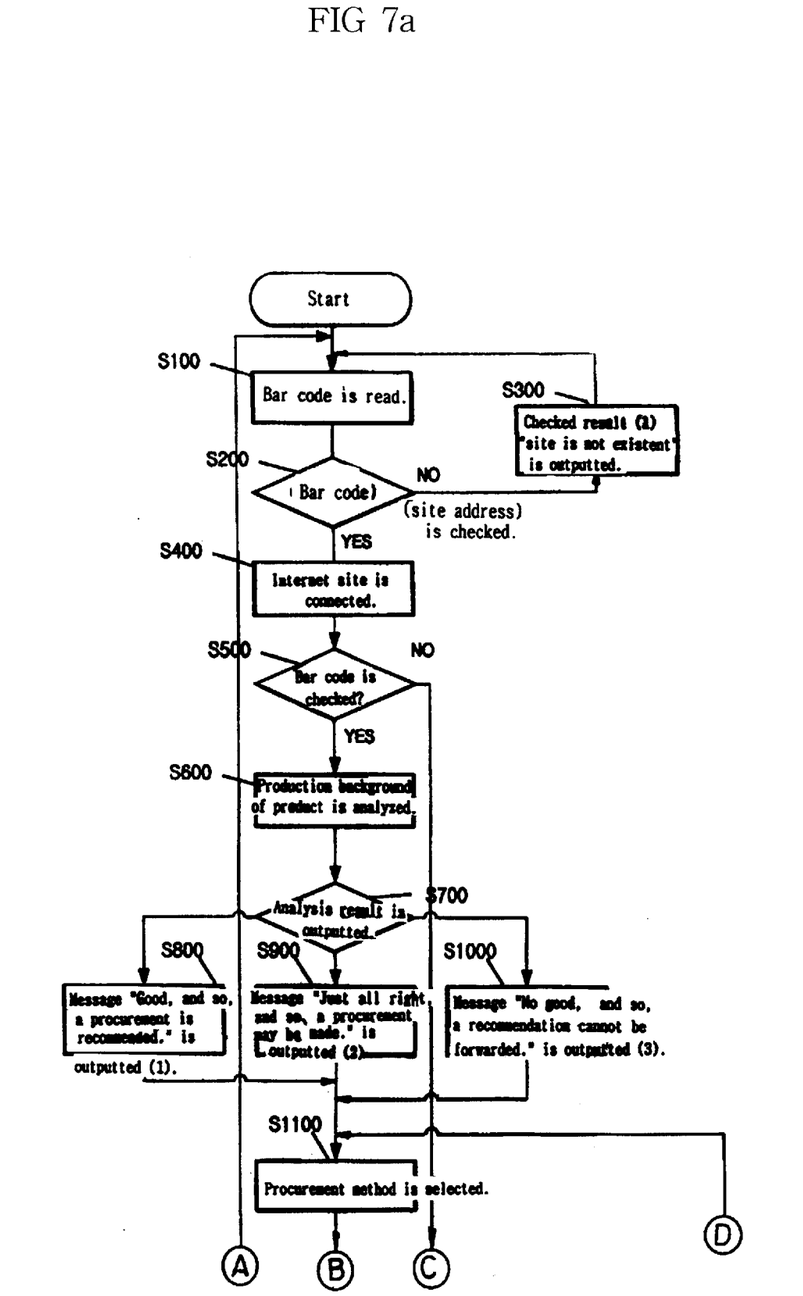
FIGS. 7a and 7b are flow charts showing the operation procedure of the bar code system of FIG. 6.
Figure 7B:
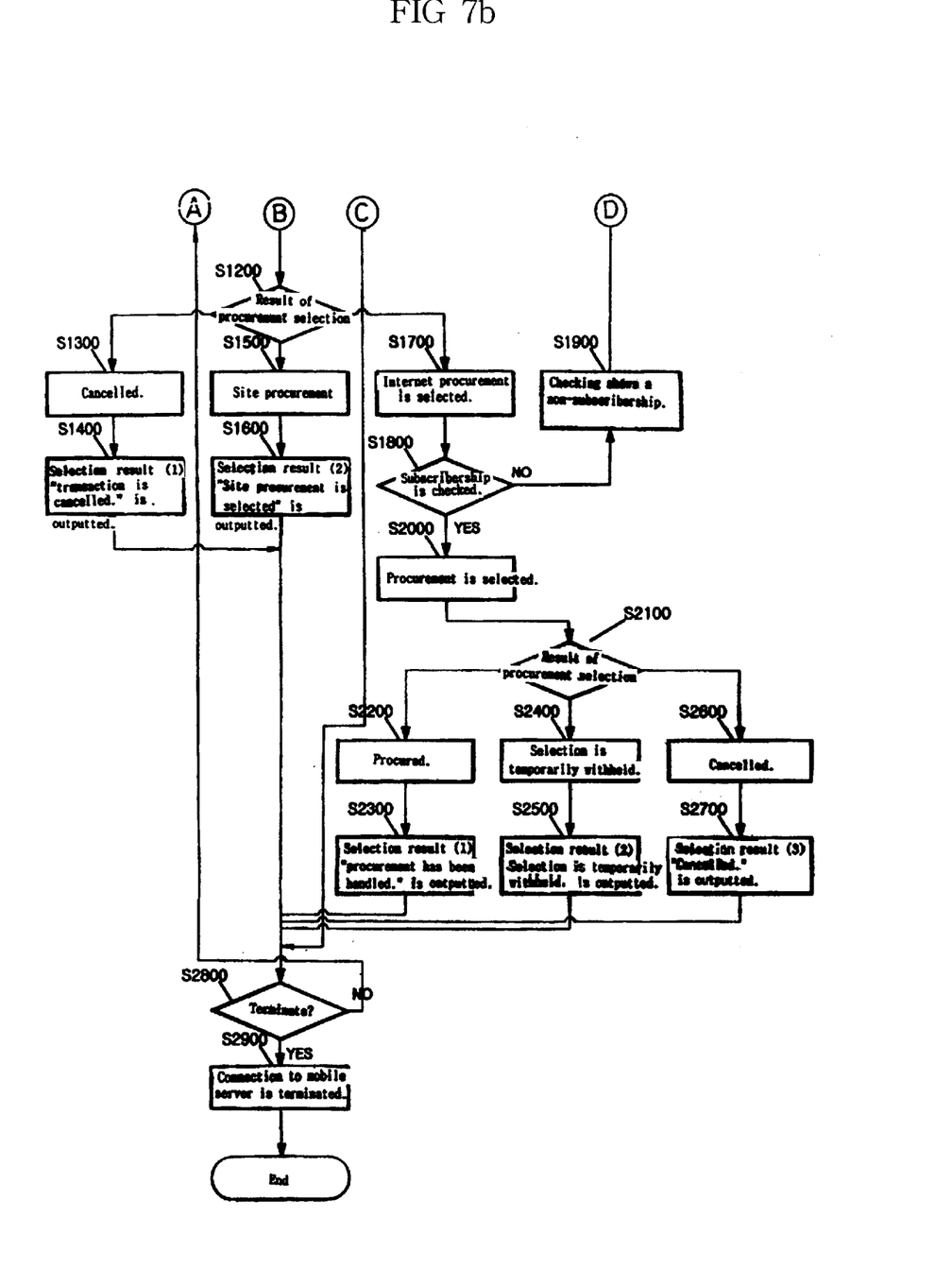

FIG. 7 is a flow chart showing the operation procedure of the bar code system of FIG. 6. In FIG. 7, the reference codes are different from those of FIG. 6. For example, S100 of FIG. 6 indicates a thing different from S100 of FIG. 7.

The bar codes are read at a step S100, and the site address of the bar codes is checked at a step S200. Upon checking, if there is no site address, then a site address non-existence result is outputted at a step S300. Upon checking, if there is the site address, then a connection is made to the internet site at a step S400, and checks the commodity of the bar code at a step S500. Upon checking, if there is no such a commodity, the operation is terminated. On the other hand, if there is such a commodity, then the production background information is analyzed at a step S600, and the analysis result is outputted at a step S700. In accordance with the result of the analysis, a procurement recommendation message is outputted at a step S800, a "may be made" message is outputted at a step S900, and a message "No good, so, a procurement recommendation cannot be forwarded" is outputted at a step S1000.

The procurement method is selected at a step S1100, and a procurement selection result is outputted at a step S1200. In accordance with the procurement selection result, a cancellation is outputted at a step S1300, and the cancellation selection result is outputted at a step S1400. If a site procurement is selected at a step S1500, then the site procurement selection result is outputted at a step S1600. If an internet procurement is selected at a step S1700, then a checking is carried out as to whether the relevant consumer is a subscriber at a step S1800. If the consumer is a non-subscriber, a result is outputted such that the subscriber certification has been failed. If the consumer is a subscriber, then the consumer selects the procurement at a step S2000, and the procurement selection result is outputted at a step S2100. Under this condition, if the procurement is done at a step S2200, then a result that the procurement has been completed is outputted at a step S2300. On the other hand, if the procurement is temporarily withheld at a step S2400, then the result of the withholding is outputted at a step S2500. Meanwhile, if the procurement is cancelled at a step S2600, then the cancellation result is outputted at a step S2700.

If the transaction is terminated at a step S2800, then the internet site connection is terminated at a step S2900. If the transaction is not terminated, then system returns to the initial status.

Thus a consumer can quickly discriminate the environmentphilic product among a plurality of commodities at the procuring site by the help of the ES code information service. Accordingly, the environment can be protected, and the product safety can be ensured.

Further, conventionally, the product quality guarantee and the governmental certification are focused only on the product quality, whereas the ES bar code system of the present invention evaluates the production background. Therefore, according to the present invention, the economic and social values of the products can be assessed in an objective manner.

In the present invention, the bar code itself and the reception and transmission terminals are well known ones. However, the conventional bar codes are for the producers and distributors, whereas the ES bar code of the present invention is for understanding the production background of a product by consumers. Further the ES bar code of the present invention is one which can be connected to the internet network. Thus this ES bar code is marked on every product, so that the production background of the product can be quickly known by consumers.

Further, the ES bar code of the present invention can contain diversified items in accordance with the use and purpose. Further, the ES bar code of the present invention can include an auxiliary bar code, so that a consumer can obtain other kinds of information.

In the above, the present invention was described based on the specific preferred embodiments and the attached drawings, but it should be apparent to those ordinarily skilled in the art that various changes and modifications can be added without departing from the spirit and scope of the present invention which will be defined in the appended claims.

According to the present invention as described above, the ES bar code makes it possible for consumers to know the production background of a product by connecting an internet server, unlike the conventional bar codes which are for only producers and distributors. Thus consumers can know the production background of a product at the procurement site instantly through a mobile communication terminal or a PC.

Further, the procurements of anti-environmental products are discouraged, while the procurements of environmentphilic products are encouraged. As a result, the profits of the environmentphilic producers are ensured, and therefore, the environmental contamination and pollution can be prevented.

Further, the condition of procurement is shifted from the product quality to the production background, and therefore, the environmentphilic products can improve their economic values.

Further, the ES bar code of the present invention makes it possible to elicit important information from corporations and organizations. Further, the ES bar code of the present invention can be applied to the general industries, to the medical fields and to the service fields.

What is claimed is:

1. A method for discriminating a production background of a product by a bar code system, comprising the steps of:

preparing an ES code (environmental protection and safety code) system for discriminating the production background of a product for an understanding by a consumer, the ES code system consisting of digit values of: origin (country), district, commodity classification, gene modification, safety inspection, environmental contamination management, production environment, production method of raw materials, their production time, and serial number of goods shipped;

marking the ES code, an internet domain address bar code, a conventional producer ID bar code, and a serial number of goods shipped on each product;

reading the ES code and the bar codes by means of a reading means to obtain bar code signals, and connecting to an internet ES code service exclusive server to transmit the signals of the ES code and the bar codes so as to request for the production background of a commodity; and receiving the requested production background of the product and its analysis result from the exclusive server through the ES code system, whereby the consumer can understand and discriminate the production background of the product.

2. The method as claimed in claim 1, wherein the ES code and the internet domain address bar code of the ES service exclusive server are marked at left and right sides of the conventional producer ID bar code respectively.

3. The method as claimed in claim 1, wherein the code reading means is one selected from among a code reader of a general composite mobile communication terminal, a reader of a laptop PC and a web camera of a desk top computer;

the general composite mobile communication terminal and internet are a transmission and reception means for the bar code signals; and a connection is made to an ES code information service exclusive mobile server or to a data base of the internet to obtain a data on the production background of a product.

4. The method as claimed in claim 1, further comprising the steps of:

connecting the code signals to a mobile server (S100);

inputting the ES code signals (S200);

checking the bar codes (S300);

analyzing the production background of a product (S400);

ordering to output an analyzed result (S500);

outputting and displaying the analyzed result (S600, S700 and S800);

selecting a procurement method by the consumer (S900);

displaying a procurement method selection (S1000, S1100, S1200, S1300 and S1400);

selecting an internet electronic procurement (S1500);

verifying a subscribership (S1600);

refusing a provision of information if not a subscriber (S1700);

selecting a procurement by the consumer (S1800);

outputting a procurement selection result (S2000, S2100, S2200, S2300 and S2500);

terminating the operation (S2600); and terminating the connection to the mobile server (S2700).

5. A method of providing information to a consumer regarding environmental aspects of the production of a product, comprising the steps of:

reading a bar code positioned on the product;

transmitting data contained in said bar code to a server;

analyzing information regarding environmental aspects of the production of the product dependent upon the data contained in said bar code;

receiving information regarding environmental aspects of the production of the product, whereby a consumer can make an informed decision on whether to purchase the product based in part on the received information.

6. The method of claim 5, further comprising the step of initiating procurement of the product.

7. The method of claim 6, wherein the step of initiating procurement of the product includes selecting to procure the product on site or from a remote location.

8. The method of claim 7, further comprising the step of determining whether the customer is a subscriber if procurement from a remote location is selected.

9. The method of claim 8, further comprising the step of providing a response regarding the availability of the product if procurement from a remote location is selected.

10. The method of claim 5, wherein said bar code includes data selected from the group origin of the product, product classification, gene modification, safety inspection, environmental contamination management, production environment, production method of raw materials, production time, and/or serial number.

11. The method of claim 5, wherein said received information includes a recommendation regarding procurement of the product.

12. A method of providing information to a consumer regarding environmental aspects relating to the production of a product, comprising the steps of:

reading a bar code positioned on a product;

transmitting information contained in said bar code via a computer network to a server;

evaluating a database of information based on the transmitted information contained in said bar code;

receiving information regarding environmental aspects of the production of the product resulting from the evaluation of the database of information, whereby a consumer can make an informed decision on whether to purchase the product.

13. The method of claim 12, wherein the received information includes a procurement recommendation.

14. A system for providing information to a consumer regarding environmental aspects of the production of a product, comprising:

a bar code reader;

a transmitter for transmitting information contained in a bar code positioned on the product to a remote location;

a receiver at said remote location for receiving the transmitted information;

a processor for evaluating a database of information and providing information regarding environmental aspects of the production of the product dependent upon the information contained in the bar code, whereby a consumer can make an informed decision on whether to purchase the product based in part on the information regarding production of the product.

15. The system for providing information to a consumer regarding environmental aspects of the production of a product of claim 14, wherein the bar code includes information selected from the group origin of the product, product classification, gene modification, safety inspection, environmental contamination management, production environment, production method of raw materials, production time, and/or serial number positioned on a product.

16. The system for providing information to a consumer regarding environmental aspects of the production of a product of claim 15, wherein said transmitter is selected from the group consisting of a mobile communication terminal, a portable computer, a desktop computer, or a camera.

17. The system for providing information to a consumer regarding environmental aspects of the production of a product of claim 16, wherein the information provided by the processor includes a recommendation regarding the purchase of the product.

18. The system for providing information to a consumer regarding environmental aspects of the production of a product of claim 17, wherein at least one of the information contained in a bar code and the information provided by the processor is transmitted and received via a computer network.

19. The system for providing information to a consumer regarding environmental aspects of the production of a product of claim 14, wherein the bar code includes at least one of an internet domain name address, a producer's name, and/or a serial number of the product.

20. The system for providing information to a consumer regarding environmental aspects of the production of a product of claim 19, wherein said bar code reader is incorporated in said transmitter selected from the group consisting of a mobile communication terminal, a portable computer, or a desktop computer, or a camera.

21. The system for providing information to a consumer regarding environmental aspects relating to the production of a product of claim 20, wherein the transmitter and receiver transmit and receive information via the internet.

* * * * *